United States Patent
Josiam et al.

(10) Patent No.: US 9,025,521 B2
(45) Date of Patent: May 5, 2015

(54) METHOD FOR ENABLING COLLABORATION AMONG TERMINALS IN A WIRELESS NETWORK

(75) Inventors: Kaushik Josiam, Dallas, TX (US); Zhouyue Pi, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 842 days.

(21) Appl. No.: 13/295,552

(22) Filed: Nov. 14, 2011

(65) Prior Publication Data

US 2012/0127935 A1    May 24, 2012

Related U.S. Application Data

(60) Provisional application No. 61/415,259, filed on Nov. 18, 2010.

(51) Int. Cl.
*H04W 72/12* (2009.01)
*H04L 1/00* (2006.01)
*H04L 1/16* (2006.01)

(52) U.S. Cl.
CPC ........ *H04W 72/121* (2013.01); *H04W 72/1289* (2013.01); *H04L 1/004* (2013.01); *H04L 1/16* (2013.01); *H04L 2001/0097* (2013.01)

(58) Field of Classification Search
USPC .................. 370/328, 400, 401, 432
See application file for complete search history.

(56) References Cited

U.S. PATENT DOCUMENTS

2009/0147746 A1    6/2009  Alay et al.

OTHER PUBLICATIONS

Kyujin Park et al., "Device Cooperation for M2M Communications", IEEE 802.16 Broadband Wireless Access Working Group, IEEE 802.16ppc-10/0004r2, Nov. 10, 2010.

Inuk Jung, "Study Report on Hierarchical Networks (Revised Working Document)", IEEE 802.16 Broadband Wireless Access Working Group, IEEE 802.16ppc-10/0008r2, Nov. 11, 2010.

Xiangming Li et al., "Cooperative Communications Based on Rateless Network Coding in Distributed MIMO Systems", IEEE Wireless Communications, Jun. 2010, p. 60-67.

*Primary Examiner* — Alvin Zhu
(74) *Attorney, Agent, or Firm* — Jefferson IP Law, LLP

(57) ABSTRACT

A method for Mobile Station (MS) collaboration for a Downlink (DL) or Uplink (UL) transmission in a wireless network having MSs in a Base Station (BS) cell is provided. The DL transmission method includes forming a cluster of MSs having a same type of radio interface, receiving, by each MS, a DL transmission including a DL control channel message and a DL data burst, extracting, by the MSs, a DL data assignment included in the DL control channel message and indicating a receiving MS intended to receive the DL data burst, decoding, by the MSs, the DL data assignment and the DL data burst according to a determination to collaborate in the DL transmission, transmitting, by the collaborating MSs, a re-encoded DL data burst to the receiving MS, the receiving MS receiving the re-encoded DL data burst from the collaborating MSs and the DL data burst from the BS.

31 Claims, 6 Drawing Sheets

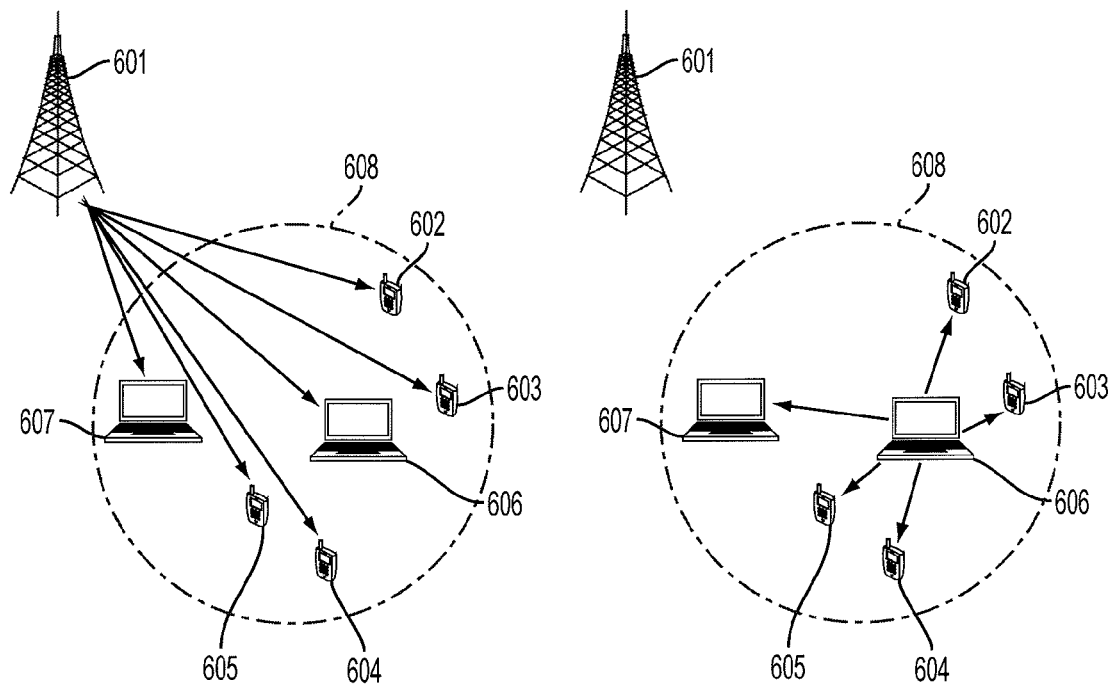
FIG. 6A
FIG. 6B
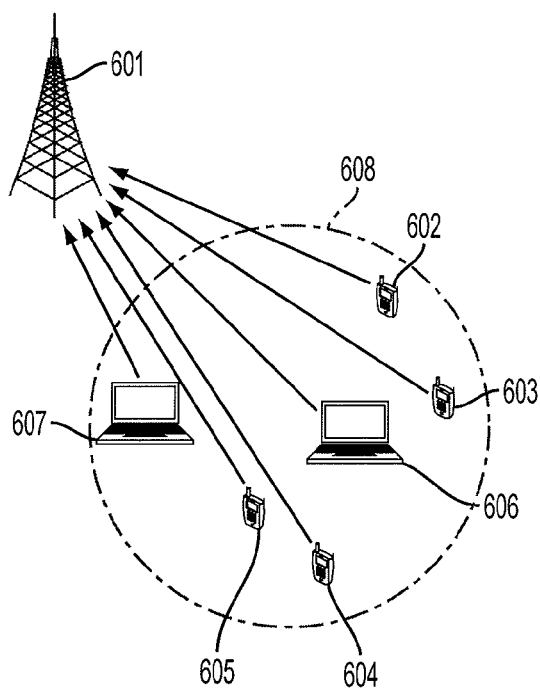
FIG. 6C

METHOD FOR ENABLING COLLABORATION AMONG TERMINALS IN A WIRELESS NETWORK

CROSS-REFERENCE TO RELATED APPLICATIONS

This application claims the benefit under 35 U.S.C. §119(e) of a U.S. Provisional application filed on Nov. 18, 2010 in the U.S. Patent and Trademark Office and assigned Ser. No. 61/415,259, the entire disclosure of which is hereby incorporated by reference.

BACKGROUND OF THE INVENTION

1. Field of the Invention

The present invention relates to a method for enabling collaboration among terminals in a wireless network. More particularly, the present invention relates to a method for wireless and fixed terminals of a wireless network to collaboratively communicate with a Base Station (BS) in order to enhance a diversity gain in a wireless network.

2. Description of the Related Art

Wireless communication systems including Mobile Stations (MSs), which are also referred to as mobile terminals, or terminals, are developed to provide wireless communication between users. As technology has advanced, mobile terminals provide an increasing number of features, such as data communications, internet browsing, video conferencing and/or chatting, personal media player functionality, Short Messaging Service (SMS), Multimedia Message Service (MMS), E-mail, games, short range or near field communication, an image capturing function and other similar functions and features. Along with the increasing functionality of mobile stations, there has been a corresponding increase in the number of users of wireless communication systems.

A wireless communication system uses a wireless communication network, wherein a certain geographical region is divided into sub-regions called cells. The MSs in each cell are served by a base station (BS) that transmits information to a particular MS, or a group of MSs, in its cell. The BS transmits information to the MSs using radio signals along a downlink (DL) radio path, and the MSs transmit information to the BS on an uplink (UL) radio path. The wireless communication system may communicate via a Time Division Duplex (TDD) scheme, a Frequency Division Duplex (FDD) scheme, or Orthogonal Frequency Division Multiplexing (OFDM) as a modulation scheme.

Using the FDD modulation scheme, the transmissions on the UL and the DL may be transmitted at the same time interval, but on different frequency bands. Using the TDD modulation scheme, the transmission on the UL and the DL may be transmitted using the same frequency band but during non-overlapping time intervals. Furthermore, with advancements in research and development, the OFDM modulation scheme has become more widely deployed and developed. Using OFDM, an available bandwidth for a radio path, either the DL or the UL path, is divided into a large number of smaller-bandwidth units, referred to as subcarriers, onto which the information to be transmitted is embedded.

By using a plurality of subcarriers, the OFDM modulation scheme is a multicarrier technique and is increasingly used in wireless communication systems due to its robustness to multipath fading and simpler implementation. The number of OFDM subcarriers in an OFDM system is generally selected to be a power of 2, which allows for using a more efficient Fast Fourier Transform (FFT) and Inverse FFT (IFFT) algorithms. The OFDM subcarriers each transmit a respective complex modulation symbol used to carry the digital information transmitted to, from or between users and elements of the mobile communication system using OFDM.

FIG. 1 illustrates an OFDM transmitter according to the related art.

Referring to FIG. 1, the complex modulation symbols, $X(k) \ k=0, 1, \ldots, (N-1)$, are mapped to an IFFT unit 101 of an OFDM transmitter 100. Also illustrated are Guard subcarriers that reduce an amount of Inter-Symbol Interference (ISI), and, upon which no information is transmitted on the guard subcarriers. After respectively performing IFFT operations on the complex modulation symbols and the guard carriers, the IFFT unit 101 provides the time domain signals to a Parallel-to-Serial (P/S) multiplexer 102 in order to multiplex the time domain signals into a serial signal. The serial signal is provided to a Cyclic Prefix (CP) unit 103 which adds CP samples to the serialized time domain signal after the IFFT operation. The resulting sequence, including the CP, is up-converted from a baseband frequency signal into a Radio Frequency (RF) signal using a Digital-to-Analog Converter (DAC)/RF unit 104. The RF signal is then provided to a Power Amplifier (PA) 105 in order to amplify and transmit the radio signal via a transmit antenna 106.

FIG. 2 illustrates an OFDM receiver according to the related art.

Referring to FIG. 2, in an OFDM receiver 200, a signal is received at a receive antenna 201 and is filtered and amplified by a Low Noise Amplifier (LNA) 202. Next, the received signal is down-converted from an RF signal into a baseband signal and is converted from an analog signal to a digital signal by an Analog-to-Digital Converter (ADC)/RF unit 203. The CP samples of the received digital signal are discarded by a CP Removal unit 204, and the serialized signal is demultiplexed by a Serial-to-Parallel (S/P) demultiplexer 205 and FFT operations are performed on the received digital signals by the FFT unit 206 in order to convert the time domain signal into a frequency domain signal. Next, Frequency Domain Equalization (FDE) operations are performed by the FDE unit 207 using channel estimates obtained from received pilots or reference signals and the estimates of the transmitted complex modulation symbols are obtained.

In the wireless communication systems using the OFDM modulation scheme, if MSs in a cell of a BS simultaneously use non-overlapping subcarrier sets for UL transmissions to the BS, then, when the UL transmissions are received at the BS, the transmission from any one MS is rendered orthogonal to the transmission from any other MS. For example, if a MS i uses subcarrier set $\{S_i\}$ for UL transmissions to the BS, wherein the subcarrier sets used by different MSs are non-overlapping, then, the UL transmissions from the MS i on subcarrier set $\{S_i\}$ received by the BS are not interfered with by any of the transmissions to the BS from any of the MSs in the cell of the BS. Similarly, for DL transmissions from the BS to different MSs, if the BS uses non-overlapping subcarriers to make simultaneous transmissions to the different MSs, then any one DL transmission to a MS is orthogonal to another DL transmission meant for any other MS in the cell of the BS.

This property of the OFDM modulation scheme, that is, the use of orthogonal transmissions signals, allows for simultaneous communications between several MSs and the BS on the UL, and between the BS and several MSs on the DL. Furthermore, when the transmission from the BS or the MS is intended for a single MS or BS, then such transmissions are termed unicast or point-to-point transmissions. When the transmission from the BS or the MS is intended for multiple receivers, such transmissions are called broadcast transmissions. Data can also be transmitted as a broadcast transmission, as in the case of a mobile broadcast TV. Another class of transmissions, multi-cast transmissions are point-to-multipoint, but are specialized transmissions designed for a specific set of receivers rather than any receiver receiving the signal.

In addition to the OFDM modulation scheme, wireless communication systems employ multi-hop relaying to enable data transmitted from a source to reach a destination as a unidirectional flow using relay methods and hierarchical deployments of infrastructure stations, such as BSs and Relay Stations (RSs) or other similar network elements of a wireless communication system. Alternatively, multiple infrastructure stations may transmit data in-tandem to a destination MS in order to take advantage of the broadcast nature of the wireless medium. Such relaying techniques are known as cooperative relaying. These multiple transmissions from the multiple infrastructure stations, when coherently combined at the destination MS, provide a cooperative diversity gain to the signal received by the destination MS, and thus, improving signal quality in a mobile communication system.

In a wireless communication system, typically, a distribution of MS locations in a cell or around a BS is hardly uniform, and a density of MSs located around and/or served by a BS changes depending on a physical geography, a network geography, a network topology and other similar factors. For example, in high density urban and/or conurbation areas, there is a higher density of mobiles per square mile as compared to suburban and rural areas. Density of MSs around a BS is also time dependent, wherein cities, and particularly downtown or business district areas including office buildings that are heavily populated during daylight hours, have higher density of MSs per square mile during the day time as compared to the night time. The high amount of geographical or spatial proximity between MSs is referred to as clustering. However, this high density, or clustering of MSs in certain and particular areas is not currently exploited by mobile communication systems. Accordingly, there is a need for an apparatus and a method for providing terminal collaboration in order to exploit the high density or clustering of MSs so as to improve cellular communications and throughput without adding extra hardware or capacity to the network.

SUMMARY OF THE INVENTION

Aspects of the present invention are to address at least the above-mentioned problems and/or disadvantages and to provide at least the advantages described below. Accordingly, an aspect of the present invention is to provide an apparatus and method for enabling collaboration among terminals in a wireless network.

In accordance with an aspect of the present invention, a method for Mobile Station (MS) collaboration for a Downlink (DL) transmission in a wireless network having a plurality of MSs in a cell corresponding to a Base Station (BS) is provided. The method includes forming a cluster including a plurality of MSs, each of the MSs of the cluster having a same type of a radio interface, receiving, by each of the MSs of the cluster, a DL transmission including a DL control channel message and a DL data burst, extracting, by each of the MSs of the cluster, a DL data assignment included in the DL control channel message, the DL data assignment indicating a receiving MS from among the MSs of the cluster, the receiving MS being the intended recipient of the DL data burst, decoding, by each of the MSs of the cluster, the DL data assignment and the DL data burst according to a determination by each of the MSs to collaborate in the DL transmission, transmitting, by each of the collaborating MSs of the cluster, a re-encoded DL data burst to the receiving MS of the cluster, and receiving, by the receiving MS of the cluster, the re-encoded DL data burst transmitted from each of the collaborating MSs and the DL data burst from the BS.

In accordance with another aspect of the present invention, a method for Mobile Station (MS) collaboration for an Uplink (UL) transmission in a wireless network having a plurality of MSs in a cell corresponding to a Base Station (BS) is provided. The method includes forming a cluster including a plurality of MSs, each of the MSs of the cluster having a same type of a radio interface, receiving, by each of the MSs of the cluster, an UL channel assignment in a DL control channel message, extracting, by each of the MSs of the cluster, a UL channel assignment included in the DL control channel message, the UL channel assignment indicating UL channels respectively assigned to each of the MSs of the cluster, transmitting, by a transmitting MS that is one of the MSs of the cluster, the UL data to other MSs of the cluster, encoding, by collaborating MSs, the UL data received from the transmitting MS according to the UL channel assignment, the collaborating MSs being MSs of the cluster that have determined to collaborate for the UL transmission, concurrently transmitting, by each of the collaborating MSs of the cluster and the transmitting MS, the encoded UL data to the BS as the UL transmission, and receiving, by the receiving BS, the concurrent transmission of the UL transmission.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIGS. 6A to 6C illustrate a method for terminal collaboration on the UL according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for enabling collaboration among terminals in a wireless network.

Figure 1:
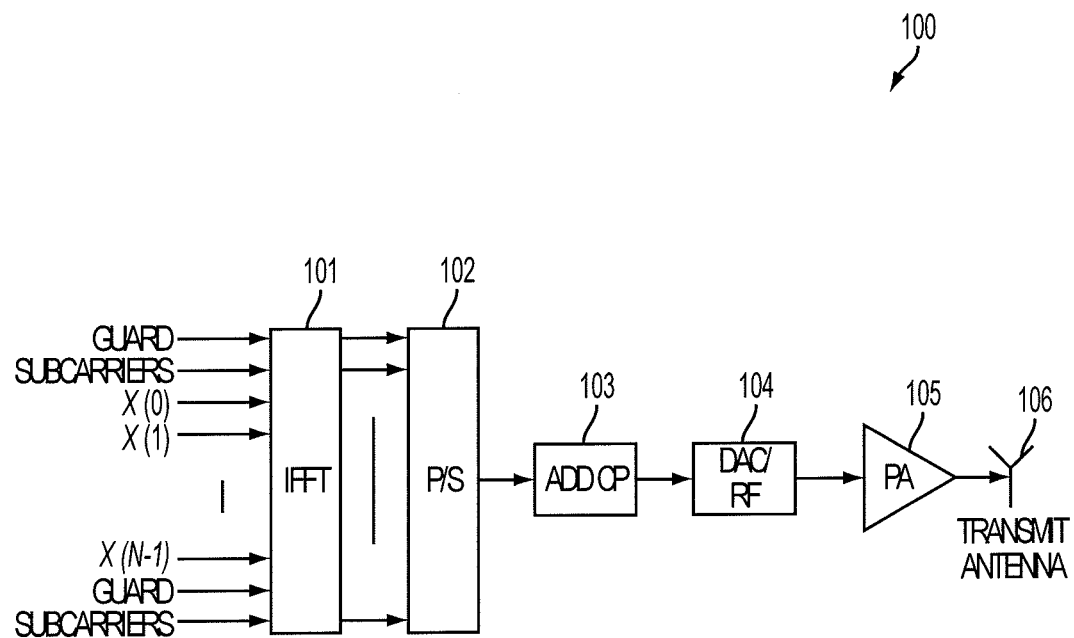
FIG. 1 illustrates an OFDM transmitter according to the related art.
Figure 2:
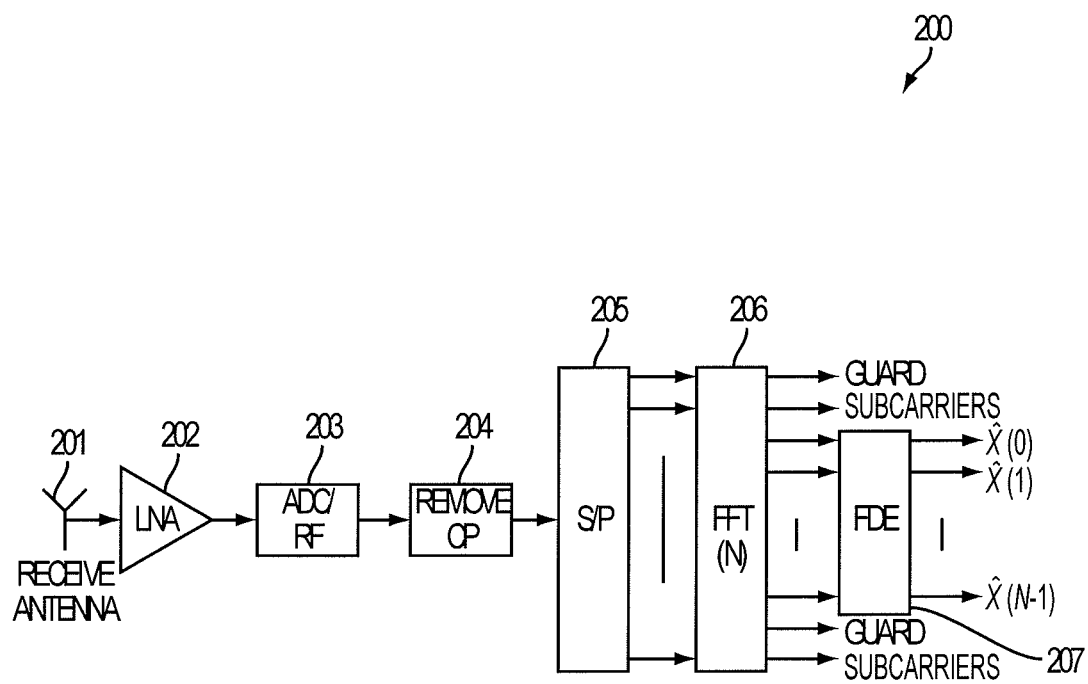
FIG. 2 illustrates an OFDM receiver according to the related art.
Figure 3:
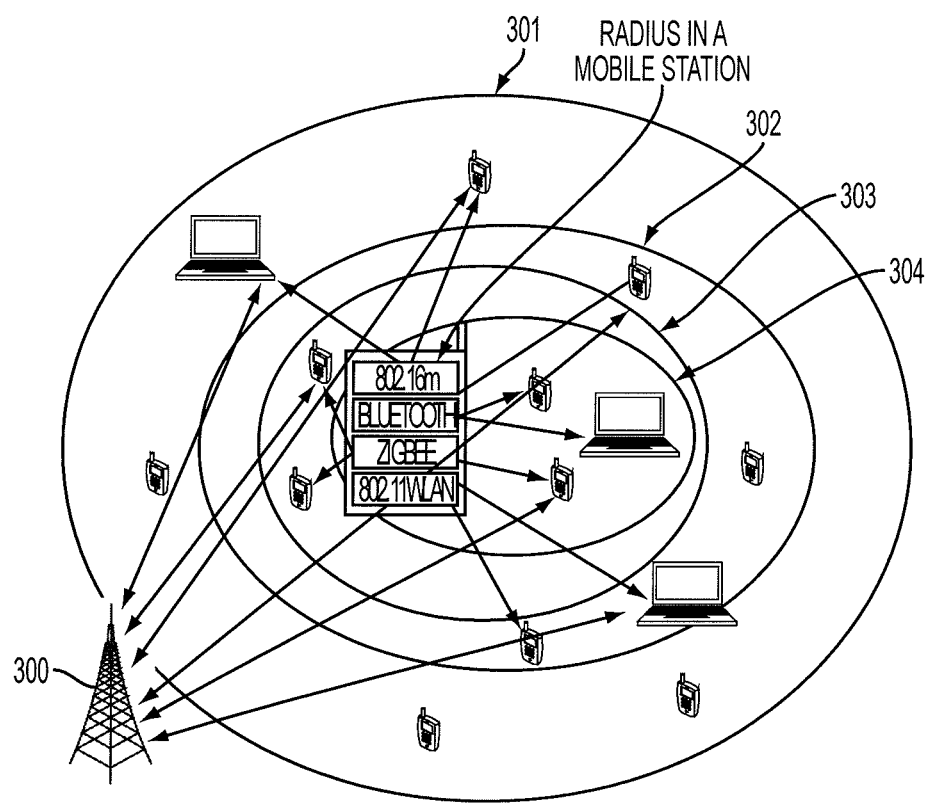
FIG. 3 illustrates a multi-radio environment and radio based terminal collaboration according to an exemplary embodiment of the present invention.

FIG. 3 illustrates a multi-radio environment and radio based terminal collaboration according to an exemplary embodiment of the present invention.

Referring to FIG. 3, the multi-radio environment includes several coverage areas respectively corresponding to different wireless communication network types that may overlap with each other. A Base Station (BS) 300 provides an Institute for Electrical and Electronics Engineers (IEEE) 802.16m network, or Worldwide Interoperability form Microwave Access (WiMax) network, communication cell having a first coverage area 301. However, the present invention is not limited thereto, and the base station may provide a 3GPP LTE network, an HSPA network or any other suitable cellular network communication cell having the first coverage area 301. The multi-radio environment of FIG. 3 also includes an IEEE 802.11 Wireless Local Area Network (WLAN), or WiFi network having a second coverage area 302, a Bluetooth network having a third coverage area 303, and a Zigbee network having a fourth coverage area 304.

Mobile Stations (MSs) may be found throughout the multi-radio environment of FIG. 3, and may be in any one or more than one of the coverage areas 301 to 304. The MS may be disposed in high density areas and locations wherein the MSs are clustered together. These MSs may possess more than one radio or modem for wireless communications and use different wireless communication systems to communicate with other mobile stations using a variety of wireless communication networks. The MSs include a cellular modem for communication via a cellular network, such as a 3$^{rd}$ Generation Partnership Project (3GPP) Long Term Evolution (LTE) network using an Orthogonal Frequency Division Multiplexing (OFDM) modulation scheme, a Global System for Mobile Communications (GSM) network, an Enhanced Data rates for GSM Evolution (EDGE) network, a High-Speed Packet Access (HSPA) network, a WiMax Network, or other similar cellular networks. Additionally, the MSs may have radios and modems for communications via other wireless communication network types, such as an IEEE 802.11 local area network, a Bluetooth personal area network, a Zigbee personal area network, and other similar communication network types. These additional radios and modems may be used by MSs that form clusters according to a proximity and a range of the radio and modems of a certain network type that are used to form the cluster. The term "Mobile Station", as used herein, may refer to a variety of wireless communication devices, including, but not limited to, cellular and/or mobile phones, laptops, personal computers, peripheral wireless communication devices such as Universal Serial Bus (USB) modems, tablet computers, electronic-books, or other similar portable and wireless electronic devices. Furthermore, the term "Mobile Station" or "MS" is used interchangeable with the term "Portable Station" or "PS", which may also refer to fixed electronic device having a modem that is capable of communicating with the cellular network.

The MSs can form radio based clusters according to where the MSs are located with respect to the coverage areas 301 to 304 for each network type. Respective sizes of the coverage areas 301 to 304 depend on transmit powers and configurations of the corresponding radios and modems of the MSs in the respective coverage areas 301 to 304. For example, the size of the coverage area 301 depends on a transmit power $P_{T\_WiMAX}$ of the MSs using the WiMax wide area network, and the size of the coverage area 302 depends on a transmit power $P_{T\_WiFi}$ of the MSs using the WiFi local area network. Within each of the coverage areas 301 to 304, an MS can have independent clusters for each radio or modem contained in the MS. The MSs form clusters according to the following axioms:

1. An MS is a member of at least one radio cluster;
2. A group of MS can cluster with multiple radios;
3. Each MS has a radio for connecting to a wide area or macro network radio. As noted above, each MS may have more than one radio or modem, and accordingly, characteristics of each cluster of an MS are dependent on a range of a respective radio or modem used to form the cluster and the number of MSs forming a cluster. Clusters formed according to the above noted axioms, and having characteristics depending on the range of the respective radio or modem and the number of MSs forming the cluster are used for terminal collaboration in order to improve cellular capacity without adding extra network elements and capacity to a mobile communication system. Furthermore, it is presumed that MSs belonging to a cluster are geographically proximate to each other with respect to the radio or modem used to form the cluster, however, it is not presumed that MSs that are geographically proximate belong to the same cluster.

Figure 4:
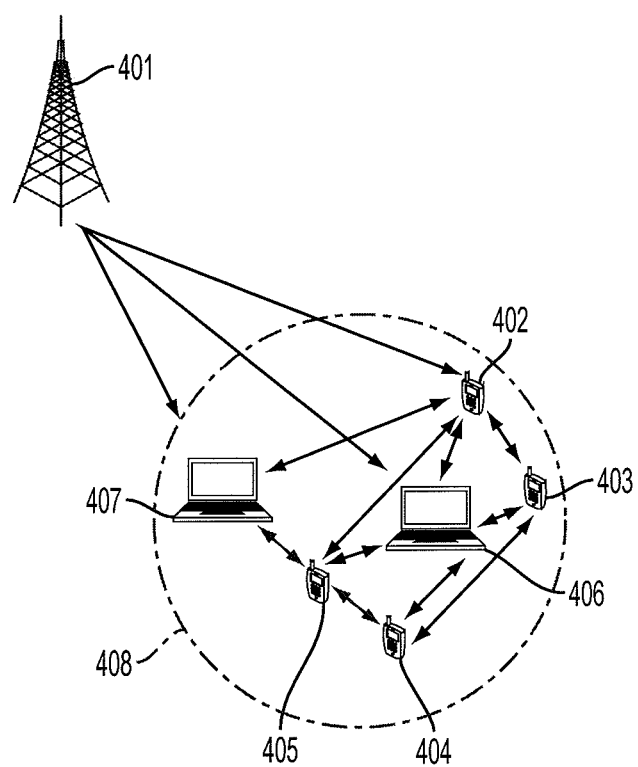
FIG. 4 illustrates cluster management for terminal collaboration that is transparent to a BS according to an exemplary embodiment of the present invention.

FIG. 4 illustrates cluster management for terminal collaboration that is transparent to a BS according to an exemplary embodiment of the present invention.

Referring to FIG. 4, an infrastructure station, such as a BS 401, provides Wide Area Network (WAN) connectivity to a plurality of MSs 402 to 405 and portable terminals 406 and 407. The WAN connectivity may be provided through any suitable cellular network, such as a 3GPP LTE network, a GSM network, a WiMax Network, or other similar cellular networks. Furthermore, a peer-to-peer network, or multi-radio cluster 408 is formed by the MSs 402 to 405 and the portable terminals 406 and 407 that directly communicate with each other. In the present exemplary embodiment, the BS 401 may not be aware of or recognize the multi-radio cluster 408. In other words, in the present exemplary embodiment, terminal collaboration between the MSs 402 to 405 and the portable terminals 406 and 407 can be transparent to the BS 401. However, the present invention is not limited thereto, and the multi-radio cluster 408 may be known and visible to the BS 401.

In the exemplary embodiment shown in FIG. 4, the multi-radio cluster 408 is formed locally between MSs 402 to 405 and portable terminals 406 and 407, and furthermore, the existence of the multi-radio cluster 408 is not known to the BS 401. Because the BS 401 is unaware of the multi-radio cluster 408, the BS 401, when transmitting to a specific device from among the MSs 402 to 405 or the portable terminals 406 and 407 using a DL, targets the transmission for only the specific device from among the MSs 402 to 405 or portable terminals 406 and 407. In order to enable terminal collaboration in the multi-radio cluster 408, two aspects of terminal collaboration must be executed, that is cluster management and a procedure for terminal collaboration between the MSs 402 to 405 and the portable terminals 406 and 407 must be executed.

In the exemplary embodiment of FIG. 4, each of the MSs 402 to 405 and the portable terminals 406 and 407 has an assigned unique Identification (ID) number for identification within the coverage area of the wide area network. For example, in a WiMax network, the BS 401 respectively assigns or issues a unique ID that is 12 bits long to each of the MSs 402 to 405 and the portable terminals 406 and 407. In order to manage the multi-radio cluster 408, the unique ID number of each of the MSs 402 to 405 and the portable terminals 406 and 408 that are included in the multi-radio cluster 408 is shared with other members in the multi-radio cluster 408.

Each of the MSs 402 to 405 and the portable terminals 406 and 408 in the multi-radio cluster 408 store all the received unique IDs that belong to the other MSs in the multi-radio cluster 408. The sharing of the unique IDs can be done using any of the radios or modems included in the MSs 402 to 405 and the portable terminals 406 and 407, and can be shared using more than one radio or modem of each of the MSs 402 to 405 and the portable terminals 406 and 407. Furthermore, each of the radios or modems respectively included in each of the MSs 402 to 405 and the portable terminals 406 and 407 may store and maintain a table of other MSs from among the MSs 402 to 405 and the portable terminals 406 and 407 belonging to the multi-radio cluster 408 cluster using a respective radio or modem. As noted above, in the exemplary embodiment of FIG. 4, the BS 401 providing a connection to the WAN is not aware of the existence of the multi-radio cluster 408.

Figure 5B:
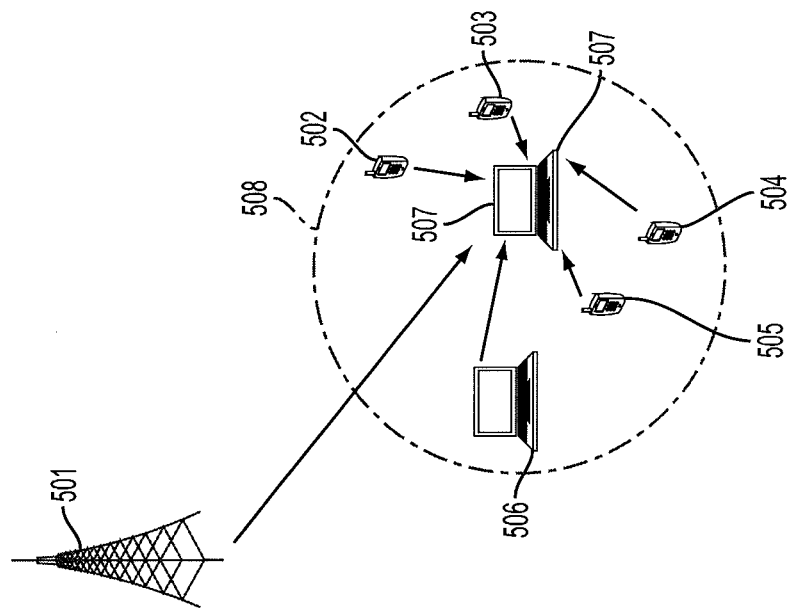
FIGS. 5A and 5B illustrate a method for terminal collaboration on the DL according to an exemplary embodiment of the present invention.
Figure 5A:
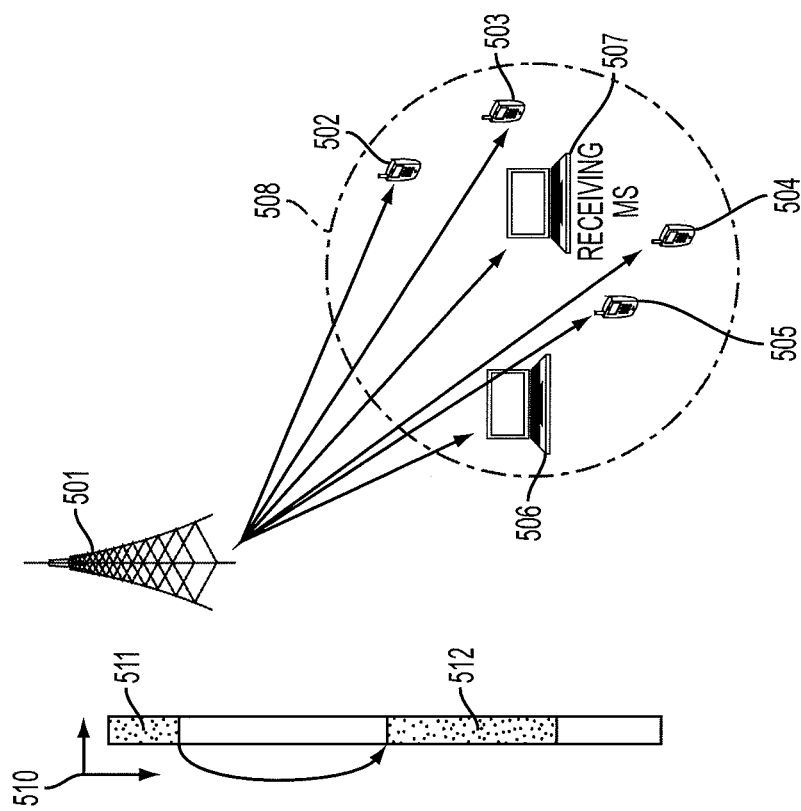

FIGS. 5A and 5B illustrate a method for terminal collaboration on the DL according to an exemplary embodiment of the present invention.

Referring to FIGS. 5A and 5B, an infrastructure station, such as a BS 501, provides Wide Area Network (WAN) connectivity to a plurality of MSs 502 to 505 and portable terminals 506 and 507. The WAN connectivity may be provided through any suitable cellular network, such as a 3GPP LTE network, an HSPA/EDGE network, a WiMax Network, or other similar cellular networks. Furthermore, a peer-to-peer network, or multi-radio cluster 508 is formed by the MSs 502 to 505 and the portable terminals 506 and 507 directly communicating with each other. In order to perform terminal collaboration on the DL in the multi-radio cluster 508 that is transparent to the BS 501, the following procedure is as follows.

First, in a case where a data burst 512 is to be transmitted to a receiving portable terminal 507, all MSs from among the MSs 502 to 505 and the portable terminals 506 and 507 that are in the multi-radio cluster 508 look for data assignments 509 (not shown) that are for themselves or any other MSs in the multi-radio cluster 508. The data assignment is conveyed in a subframe 510 that includes a downlink control channel message 511 including an identification tag for a unique ID of the MS from among the MSs 502 to 505 and the portable terminals 506 and 507 for which the data is assigned. Next, the data assignment 509 in the subframe 510 is decoded by all the MSs from among the MSs 502 to 505 and the portable terminals 506 and 507 that are in the multi-radio cluster 508 and that have chosen to collaborate. The MSs that have chosen to collaborate are referred to as collaborating terminals, and in the present exemplary embodiment include the MSs 502 to 505 and portable terminal 506.

After decoding the data assignment 509, the collaborating terminals 502 to 506 in the multi-radio cluster 508 re-encode and forward the data burst 512 to the receiving portable terminal 507 on a radio or modem corresponding to the multi-radio cluster 508, and for which the receiving portable terminal 507 is also a member. In the present exemplary embodiment, the re-encoding of the data burst 512 includes the receiving and identifying of the data burst 512 by the collaborating terminals 502 to 506. Furthermore, the collaborating terminals 502 to 506 may further process the data burst 512 or store or locally save the data burst 512 before forwarding the data burst 512 to the receiving portable terminal 507. The receiving portable terminal 507 receives the data burst 512 from the BS 501 and all of the collaborating terminals 502 to 506, and processes the different versions of the data burst 512 received from the different sources.

According to another aspect of the exemplary embodiment of FIG. 5, rather than all of the collaborating terminals 502 to 506, a subset of collaborating terminals 502 to 506 may transmit the received data burst 512 to the receiving portable terminal 507. In order for the collaborating terminals 502 to 506 to determine whether to transmit the received data burst 512 to the receiving portable terminal 507, each of the collaborating terminals 502 to 506 may determine factors such as a quality of the received data burst 512, a current channel condition between a respective one of the collaborating terminals 502 to 506 and any other terminal or network element, such as the receiving terminal 507, or any other similar factors related to wireless data communication or a state of the collaborating terminals 502 to 506, such as an idle state or an active state. Additionally, the collaborating terminals 502 to 506 may determine whether to transmit the received data burst 512 to the receiving portable terminal 507 according to a comparison between predetermined thresholds and the factors noted above, or according to other factors related to wireless data communication.

According to another aspect of the exemplary embodiment of FIG. 5, rather than the collaborating terminals 502 to 506 transmitting the received data burst 512 directly to the receiving terminal 507, the collaborating terminals 502 to 506 may transmit the received data burst 512 along other routes that include other collaborating terminals 502 to 506, which then forward the received data burst 512 to the receiving terminal 507. Furthermore, because there may be more than one useful route from any one of the collaborating terminals 502 to 506 to the receiving terminal 507, the collaborating terminals 502 to 506 may determine and store route information including information on any of the routes between the MSs 502 to 505 and the portable terminals 506 and 507 that are in the multi-radio cluster 508. Accordingly, any one of the collaborating terminals 502 to 506 may determine an optimized route between a respective one of the collaborating terminals 502 to 506 and the receiving terminal 507.

According to another aspect of the exemplary embodiment of FIG. 5, after the receiving terminal 507 receives the data burst 512, the receiving terminal 507 may send a Hybrid Automatic Repeat Request (HARQ) ACKnowledgement (ACK)/Negative ACK (NACK) message to any of the collaborating terminals 502 to 506 regarding a status or completeness of the received data burst 512. In a case where the data burst 512 is not successfully received by the receiving terminal 512, there may be an NACK and retransmission exchange between any of the collaborating terminals 502 to 506 and the receiving terminal 507. After the NACK and retransmission exchange has been completed, the receiving terminal 507 may exchange the ACK/NACK message with the BS 501 regarding the status or completeness of the received data burst 512.

FIGS. 6A to 6C illustrate a method for terminal collaboration on the UL according to an exemplary embodiment of the present invention.

Referring to FIGS. 6A to 6C, an infrastructure station, such as a BS 601, provides Wide Area Network (WAN) connectivity to a plurality of MSs 602 to 605 and portable terminals 606 and 607. The WAN connectivity may be provided through any suitable cellular network, such as a 3GPP LTE network, an HSPA/EDGE network, a WiMax Network, or other similar cellular networks. Furthermore, a peer-to-peer network, or multi-radio cluster 608 is formed by the MSs 602 to 605 and the portable terminals 606 and 607 directly communicating with each other.

The multi-radio cluster 608 is formed locally between MSs 602 to 605 and the portable terminals 606 and 607, such that the existence of the multi-radio cluster 608 is unknown to the BS 601. Because the BS 601 is unaware of the multi-radio cluster 608, when receiving a transmission from a specific device from among the MSs 602 to 605 or the portable terminals 606 and 607 using an UL, the BS 601 receives the UL transmission on a UL channel assignment that is meant for only the specific device from among the MSs 402 to 405 or portable terminals 406 and 407 that is transmitting to the BS 601. In order to enable terminal collaboration in the multi-radio cluster 608, two aspects of terminal collaboration must be executed, that is cluster management and a procedure for terminal collaboration between the MSs 602 to 605 and the portable terminals 606 and 607 must be executed.

First, in a case where the UL transmission from one of the MSs 602 to 605 or the portable terminals 606 and 607 to the BS 601 uses a UL data assignment control channel message, the message contains information regarding a resource assignment for UL data, a size of the UL data, a modulation and coding scheme to be used and other similar information used for the UL transmission to the BS 601.

In order to perform cluster management of the multi-radio cluster 608, each of the MSs 602 to 605 and the portable terminals 606 and 607 has an assigned unique Identification (ID) number that is recognized by the BS 601. For example, in a WiMax network, the BS 601 respectively assigns or issues a unique ID that is 12 bits long to each of the MSs 602 to 605 and the portable terminals 606 and 607. In order to manage the multi-radio cluster 608, the unique ID number of each of the MSs 602 to 605 and the portable terminals 606 and 608 that are included in the multi-radio cluster 608 is shared with and stored by the other members in the multi-radio cluster 608. In other words, each of the MSs 602 to 605 and the portable terminals 606 and 608 stores the unique IDs of each of the other MSs 602 to 605 and the portable terminals 606 and 608.

In order to perform terminal collaboration between the members of the multi-radio cluster 608 each having a unique ID, the following operations are performed. First, all MSs in the multi-radio cluster 608, which are the MSs 602 to 605 and the portable terminals 606 and 607, look for UL channel assignments for themselves or any other MSs in the multi-radio cluster 608. The UL channel assignments are contained in a DL control channel message and include the unique ID of the MS or terminal from among the MSs 602 to 605 and the portable terminals 606 and 607 for which the UL channel assignment is meant for.

Next, the UL channel assignments are decoded by all of the MSs 602 to 605 and the portable terminals 606 and 607 that are in the multi-radio cluster 608 and that have chosen to collaborate in the multi-radio cluster 608. Such MSs or portable terminals are called collaborating terminals, and in the present exemplary embodiment of FIG. 6, include the MSs 602 to 605 and the portable terminal 606. The MS or portable terminal for which the UL channel assignment is meant for is referred to as a transmitting MS or transmitting portable terminal, and in the present exemplary embodiment of FIG. 6, is portable terminal 607.

Prior to the UL transmission, the transmitting portable terminal 607 shares the data for the UL transmission with the collaborating terminals 602 to 606 in the multi-radio cluster 608 using a shared radio link. The collaborating terminals 602 to 606, along with the transmitting terminal 607, use the UL channel assignment for the transmitting portable terminal 07 to encode the data for the UL transmission as specified in the UL channel assignment. All of the MSs belonging to the multi-radio cluster 608, including the transmitting terminal 607, concurrently transmit the UL transmission on the same UL channel assigned by the BS 601 to the transmitting terminal 607, while all using the same transmission scheme as specified by the UL channel assignment. Accordingly, the BS 601 receives a combined burst transmission from all of the transmitting terminal 607 and the collaborating terminals 602 to 606. Due to the concurrent transmission from all of the MSs of the multi-radio cluster 608, a received signal power at the BS 601 may be improved. However, the present invention is not limited thereto, and the collaborating terminals 602 to 606 may send the UL transmission so as to not be a concurrent transmission, and may negotiate separate UL channel assignments to transmit the UL transmission to the BS 601.

According to another aspect of the exemplary embodiment of FIG. 6, rather than all of the collaborating terminals 602 to 606, a subset of collaborating terminals 602 to 606 may transmit the UL transmission received from the transmitting portable terminal 607 to the BS 601. In order for the collaborating terminals 602 to 606 to determine whether to transmit the received data burst 612 to BS 601, each of the collaborating terminals 602 to 606 may determine factors such as a quality of the UL transmission as received form the transmitting terminal 607, a current channel condition between a respective one of the collaborating terminals 602 to 606 and the BS 601 or any other similar factors related to wireless data communication or a state of the collaborating terminals 602 to 606, such as an idle state or an active state, or a willingness to participate in the uplink transmission of the transmitting terminal 607. Additionally, the collaborating terminals 602 to 606 may determine whether to transmit the UL transmission to the BS 601 according to a comparison between predetermined thresholds and the factors noted above, or according to other factors related to wireless data communication.

According to another aspect of the exemplary embodiment of FIG. 6, rather than the collaborating terminals 602 to 606 transmitting the UL transmission directly to the BS 601, the collaborating terminals 602 to 606 may transmit the UL transmission along other routes that include other collaborating terminals 602 to 606, which then forward the UL transmission to the BS 601. Furthermore, because there may be more than one useful route from any one of the collaborating terminals 602 to 606 to the BS 601, the collaborating terminals 602 to 606 and the transmitting terminal 607 may determine and store route information including information on any of the routes between the MSs 602 to 605 and the portable terminals 606 and 607 that are in the multi-radio cluster 508 and the BS 601. Accordingly, any one of the collaborating terminals 602 to 606 may determine an optimized route between a respective one of the collaborating terminals 602 to 606 and the BS 601.

According to another aspect of the exemplary embodiment of FIG. 6, after the BS 601 receives the UL transmission, the BS 601 may send a HARQ ACK/NACK message to the transmitting terminal 607 regarding a status or completeness of the UL transmission.

In the exemplary embodiments discussed above, the BS was unaware of the existence of the multi-radio cluster. However, according to another exemplary embodiment of the present invention, a BS may actively identify each multi-radio cluster and the respective MSs or portable terminals that are members of each multi-radio cluster, which in the present case, are referred to as infrastructure driven clusters. For example, a BS can assign a multi-radio cluster ID to a group of MSs that form a peer-to-peer collaborative network. This peer-to-peer collaborative network can be on the same radio interface as the BS or may use a different radio interface not used by the BS, such as a Zigbee or Bluetooth radio interface. The MSs identify members of the multi-radio cluster and interact with the BS that created the multi-radio cluster in order to inform the BS on the status of the multi-radio cluster. Both DL and UL transmissions may be exchanged between the BS and any of the member MSs of the multi-radio cluster.

In order to manage the multi-radio cluster for an infrastructure driven cluster, the BS creating the multi-radio cluster and the MSs identified as being members of the multi-radio cluster exchange messages regarding a size of the multi-radio cluster, the identity of the MSs in the multi-radio cluster, and activity of the multi-radio cluster. The messages may be bidirectional and can originate from the BS or the member MSs of the multi-radio cluster and can be destined for either the member MSs or the BS. The multi-radio cluster size and member MSs can be predetermined. For example, the member MSs of a of a multi-radio cluster can be associated according to any of different radio interfaces, such as a WiFi interface, a Bluetooth interface, a Zigbee interface, or any other suitable radio interface. Whenever one of the member MSs of a predetermined multi-radio cluster is proximate to any another of the member MSs, with respect to a given radio interface, the member MSs that are proximate may form a multi-radio cluster and inform the BS of the multi-radio cluster formation. The formed multi-radio cluster is identified by a unique multi-radio cluster ID. The multi-radio cluster ID may be assigned on an ad-hoc basis by the BS or may be predetermined The formed multi-radio cluster is managed by the BS in either a distributed manner or a centralized manner. In distributed cluster management, the member MSs exchange messages with the BS about a current state of the multi-radio cluster, a number of members MSs in the multi-radio cluster, whether the member MSs are participating or intend to participate in collaborative transmissions, and a current channel state or condition between any respective member MSs and the other member MSs. The exchange of the messages may occur according to a schedule determined by the BS, and may occur either with or without a request for exchange of the messages by a member MS.

In centralized cluster management, member MSs belonging to a multi-radio cluster nominate a coordinating MS from among the member MSs to inform the BS about a state of the multi-radio cluster, a number of member MSs in the multi-radio cluster, the multi-radio cluster ID, which member MSs are participating in collaborative transmission, and a current channel state or condition between any of the member MSs and other member MSs or the BS. This exchange of information in order to inform the BS of the above noted factors may be scheduled according to a request from the coordinating MS or may be scheduled independently of a request from the coordinating MS.

Member MSs belonging to a multi-radio cluster respectively determine whether to participate in a particular transmission on either the DL or the UL. This determination to participate in the particular transmission is indicated to the BS according to a control configuration or control parameters of the multi-radio cluster, as described in the preceding paragraph. In a case where a member MS participates in the particular transmission, and the BS is aware of the member MS's participation, the member MS may be scheduled to transmit or receive the DL or the UL concurrently with the respective receiving terminal or the transmitting terminal. Additionally, in both the distributed and centralized cluster management schemes, the BS may determine an optimal route to a receiving MS to be through one or more of the collaborating MSs in the multi-radio cluster. This optimal route can be determined according to a channel state between member MSs and a willingness of any of the member MSs to participate in a collaborative transmission. Furthermore, in an UL transmission, the UL transmission may be done concurrently by members MSs belonging to the multi-radio cluster, or UL transmission may be scheduled to occur individually by the BS.

According to another exemplary embodiment of the current invention, MSs in an idle state may be used for collaborative transmission when the MSs in the idle state are in a vicinity of the transmitting terminal or receiving terminal Idle MSs are MSs that maintain context with a network, or in other words, are registered with a BS of the network, but which currently do not have an active or ongoing session with the network. In other words, idle MSs are MSs that are registered in a network but are not actively transmitting data to or receiving data from the BS. For example, whenever a first member MS belonging to a multi-radio cluster is in the vicinity of another member MS that is in an idle state, the other member MS may be used to transmit or receive data for the first member MS. Accordingly, a member MS in the idle state may be used to improve diversity gain in a mobile communication system by being used for collaborative communication.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for Mobile Station (MS) collaboration for a Downlink (DL) transmission in a wireless network having a plurality of MSs in a cell corresponding to a Base Station (BS), the method comprising:

forming a cluster including a plurality of MSs, each of the MSs of the cluster having a same type of a radio interface;

receiving, by each of the MSs of the cluster, a DL transmission including a DL control channel message and a DL data burst;

extracting, by each of the MSs of the cluster, a DL data assignment included in the DL control channel message, the DL data assignment indicating a receiving MS from among the MSs of the cluster, the receiving MS being the intended recipient of the DL data burst;

decoding, by each of the MSs of the cluster, the DL data assignment and the DL data burst according to a determination by each of the MSs to collaborate in the DL transmission;

transmitting, by each of the collaborating MSs of the cluster, a re-encoded DL data burst to the receiving MS of the cluster; and receiving, by the receiving MS of the cluster, the re-encoded DL data burst transmitted from each of the collaborating MSs and the DL data burst from the BS.

2. The method of claim 1, wherein the transmitting of the re-encoded DL data burst comprises each of the collaborating MSs transmitting the re-encoded DL data using the same type of the radio interface.

3. The method of claim 1, wherein the BS is not notified of the existence of the cluster.

4. The method of claim 1, wherein the radio interface may be one of a radio interface for a Bluetooth network, a WiFi network, and a Zigbee network.

5. The method of claim 4, wherein the forming of the cluster comprises forming more than one cluster,
wherein each cluster corresponds to a different type of radio interface.

6. The method of claim 1, wherein the collaborating MSs is a subset of the MSs of the cluster.

7. The method of claim 6, wherein the collaborating MSs that are included in the subset of the MSs of the cluster are determined to be included according to at least one of a quality of the received DL data burst, and a current channel condition between a respective one of the MSs of the cluster and the receiving MS.

8. The method of claim 1, wherein the transmitting of the re-encoded DL data burst to the receiving MS comprises transmitting the re-encoded DL data burst from a collaborating MS to another collaborating MS,
wherein the other collaborating MS transmits the received re-encoded DL data burst to the receiving MS.

9. The method of claim 8, the other collaborating MS is determined according to a current channel condition between the collaborating MS and the other collaborating MS.

10. The method of claim 9, further comprising storing an indicator of the current channel condition between the collaborating MS and the other collaborating MS in a table for storing current channel conditions between the collaborating MSs.

11. The method of claim 1, further comprising transmitting, by the receiving MS, a Hybrid Automatic Repeat Request (HARQ) ACKnowledgement (ACK)/Negative ACK (HACK) message to the BS after the receiving of the DL data burst by the receiving MS.

12. The method of claim 1, further comprising transmitting, by the receiving MS, an ACKnowledgement (ACK)/Negative ACK (HACK) message to the collaborating MSs after the receiving of the DL data burst by the receiving MS.

13. The method of claim 1, wherein the forming of the cluster is performed by the BS, and
wherein the BS identifies each the MSs of the cluster according to unique Identifications (IDs) respectively corresponding to each of the MSs of the cluster.

14. The method of claim 13, further comprising:
exchanging messages between the BS and each of the MSs regarding at least one of a size of the cluster, the unique IDs of the MSs of the cluster, and whether the MSs of the cluster are collaborating in the DL transmission.

15. The method of claim 13, further comprising:
selecting, by each of the MSs of the cluster, a coordinating MS from among the MSs of the cluster;
exchanging messages between the BS and the coordinating MS regarding at least one of a size of the cluster, the unique IDs of the MSs of the cluster, and whether the MSs of the cluster are collaborating in the DL transmission; and
forwarding the exchanged messages from the coordinating MS to each of the other MSs of the cluster.

16. The method of claim 13, further comprising:
forming, by the BS, more than one cluster, each cluster corresponding to a different type of radio interface; and
assigning each of the more than one cluster a respective cluster identification.

17. A method for Mobile Station (MS) collaboration for an Uplink (UL) transmission in a wireless network having a plurality of MSs in a cell corresponding to a Base Station (BS), the method comprising:
forming a cluster including a plurality of MSs, each of the MSs of the cluster having a same type of a radio interface;
receiving, by each of the MSs of the cluster, an UL channel assignment in a DL control channel message;
extracting, by each of the MSs of the cluster, a UL channel assignment included in the DL control channel message, the UL channel assignment indicating UL channels respectively assigned to each of the MSs of the cluster;
transmitting, by a transmitting MS that is one of the MSs of the cluster, the UL data to other MSs of the cluster;
encoding, by collaborating MSs, the UL data received from the transmitting MS according to the UL channel assignment, the collaborating MSs being MSs of the cluster that have determined to collaborate for the UL transmission;
concurrently transmitting, by each of the collaborating MSs of the cluster and the transmitting MS, the encoded UL data to the BS as the UL transmission; and
receiving, by the receiving BS, the concurrent transmission of the UL transmission.

18. The method of claim 17, wherein the transmitting of the UL data to the other MSs comprises transmitting the UL data using a same type of the radio interface used by the other MSs of the cluster to receive the UL data.

19. The method of claim 17, wherein the BS is not notified of the existence of the cluster.

20. The method of claim 17, wherein the radio interface may be one of a radio interface for a Bluetooth network, a WiFi network, and a Zigbee network.

21. The method of claim 20, wherein the forming of the cluster comprises forming more than one cluster,
wherein each cluster corresponds to a different type of radio interface.

22. The method of claim 17, wherein the collaborating MSs is a subset of the MSs of the cluster.

23. The method of claim 22, wherein the collaborating MSs that are included in the subset of the MSs of the cluster are determined to be included according to at least one of a quality of the received UL data, and a current channel condition between a respective one of the MSs of the cluster and the BS.

24. The method of claim 17, wherein the concurrent transmitting of the UL transmission to the BS comprises transmitting the UL data from a collaborating MS to another collaborating MS,
   wherein the other collaborating MS transmits the received UL transmission to the BS.

25. The method of claim 24, the other collaborating MS is determined according to a current channel condition between the collaborating MS and the other collaborating MS.

26. The method of claim 25, further comprising storing an indicator of the current channel condition between the collaborating MS and the other collaborating MS in a table for storing current channel conditions between the collaborating MSs.

27. The method of claim 17, further comprising transmitting, by the BS, a Hybrid Automatic Repeat Request (HARQ) ACKnowledgement (ACK)/Negative ACK (NACK) message to the transmitting MS after the receiving of the UL transmission by the BS.

28. The method of claim 17, wherein the forming of the cluster is performed by the BS, and
   wherein the BS identifies each the MSs of the cluster according to unique Identifications (IDs) respectively corresponding to each of the MSs of the cluster.

29. The method of claim 28, further comprising:
exchanging messages between the BS and each of the MSs regarding at least one of a size of the cluster, the unique IDs of the MSs of the cluster, and whether the MSs of the cluster are collaborating in the UL transmission.

30. The method of claim 28, further comprising:
selecting, by each of the MSs of the cluster, a coordinating MS from among the MSs of the cluster;
exchanging messages between the BS and the coordinating MS regarding at least one of a size of the cluster, the unique IDs of the MSs of the cluster, and whether the MSs of the cluster are collaborating in the UL transmission; and
forwarding the exchanged messages from the coordinating MS to each of the other MSs of the cluster.

31. The method of claim 28, further comprising:
forming, by the BS, more than one cluster, each cluster corresponding to a different type of radio interface; and
assigning each of the more than one cluster a respective cluster identification.

* * * * *